Figure 1:
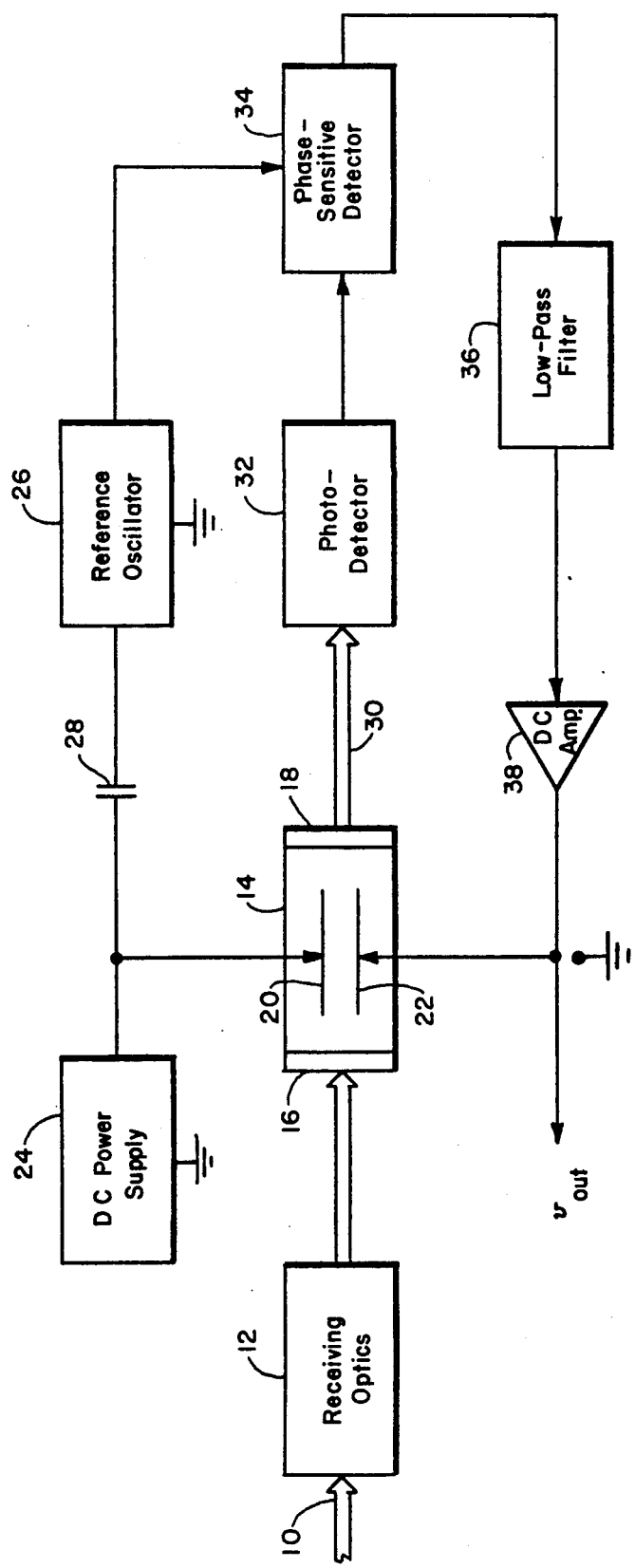

United States Patent [19]

Abrams et al.

[11] 3,979,686
[45] Sept. 7, 1976

[54] OPTICAL FREQUENCY MODULATION DEMODULATOR

[75] Inventors: Richard L. Abrams, Pacific Palisades; Thomas A. Nussmeier, Thousand Oaks, both of Calif.

[73] Assignee: Hughes Aircraft Company, Culver City, Calif.

[22] Filed: Sept. 8, 1975

[21] Appl. No.: 611,059

[52] U.S. Cl. ............................. 329/110; 250/199; 329/144; 329/DIG. 1
[51] Int. Cl.² .............................................. G02F 2/00
[58] Field of Search ...... 329/144, 122, 110, DIG. 1; 250/199; 331/94.5 S

[56] References Cited
UNITED STATES PATENTS

| | | | |
|---|---|---|---|
| 3,654,473 | 4/1972 | Nussmeier | 250/199 |
| 3,921,099 | 11/1975 | Abrams et al. | 331/94.5 S |
| 3,939,341 | 2/1976 | Graves | 329/144 X |

*Primary Examiner*—Siegfried H. Grimm
*Attorney, Agent, or Firm*—Paul M. Coble; W. H. MacAllister

[57] ABSTRACT

A laser beam frequency modulation demodulator is disclosed utilizing the highly linear frequency versus voltage characteristic of the absorption resonance provided by a Stark-effect cell. An error signal, generated by dither modulation of the Stark-effect cell voltage, is fed back to the Stark-effect cell via a low-pass filter to cause the absorption resonance to track the instantaneous frequency of the laser beam. The feedback signal applied to the Stark-effect cell has an amplitude proportional to the frequency modulation on the laser beam.

4 Claims, 2 Drawing Figures

OPTICAL FREQUENCY MODULATION DEMODULATOR

This invention relates to optical frequency demodulation, and more particularly relates to a simple and inexpensive frequency modulation demodulator for providing an electrical signal indicative of the frequency modulation on a frequency modulated laser beam.

In the past demodulation of frequency modulated laser beams has been achieved using heterodyne detection techniques. The laser beam to be demodulated is mixed with a local oscillator laser beam at a frequency different from the carrier frequency of the beam to be demodulated. The mixed beam is converted into an electrical signal at an intermediate beat frequency equal to the difference between the frequency of the beam to be demodulated and the local oscillator frequency. After passing through an intermediate frequency amplifier, the intermediate frequency electrical signal is applied to a discriminator which converts frequency deviations from the carrier frequency into corresponding amplitude variations.

It is an object of the present invention to provide a laser beam frequency modulation demodulator which is simpler, smaller and less expensive than laser beam frequency demodulators employing heterodyne detection. In particular, a demodulator according to the invention eliminates the local oscillator laser and intermediate frequency electronics required for heterodyne detection. Moreover, when the demodulator is used in a laser communication system receiver the need for diffraction limited receiving optics required in heterodyne receivers is also eliminated.

The present invention achieves frequency demodulation of a laser beam using a gas cell providing an absorption resonance which is controllably tuned by means of the linear Stark effect (the change in the absorption spectrum of a molecule when subjected to an electric field). An error signal, generated by dither modulation of the Stark-effect cell voltage, is fed back to the Stark-effect cell via a low-pass filter to cause the absorption resonance to track the instantaneous frequency of the laser beam. The feedback signal applied to the Stark-effect cell has an amplitude proportional to the frequency modulation on the laser beam.

Prior to the present invention Stark-effect tuning of molecular absorption lines had been investigated and employed for both laser modulation and laser frequency stabilization. For a more detailed background concerning previous Stark-effect work in the laser field reference may be made to A. Landman, "Modulation of the 3.39-$\mu$ Ne Line by Electro-Optic Gases", *Journal of Applied Physics*, Vol. 38 (1967), pages 3668–3675; Johnston et al U.S. Pat. No. 3,806,834, issued Apr. 23, 1974, entitled "Stark-Effect Modulation of $CO_2$ Laser with $NH_2D$"; Skolnick U.S. Pat. No. 3,622,908, issued Nov. 23, 1971, entitled "Dithered Gain Characteristic Stabilization of a Gas Laser"; Applicants' paper entitled "Stark Cell Stabilization of $CO_2$ Laser", *Applied Physics Letters*, Vol. 25 (Nov. 15, 1974), pages 615–617; and Applicants' patent application Ser. No. 506,476, filed Sept. 16, 1974, now U.S. Pat. No. 3,921,099, entitled "Frequency Stabilized Laser."

All of the prior work with Stark-effect tuning involved spectroscopic studies, laser beam modulation, or laser frequency stabilization. It was not seen that the highly linear relationship between the voltage applied to a Stark-effect cell and the frequency of the cell absorption resonance could be advantageously exploited to provide frequency demodulation of a frequency modulated laser beam.

Figure 2:
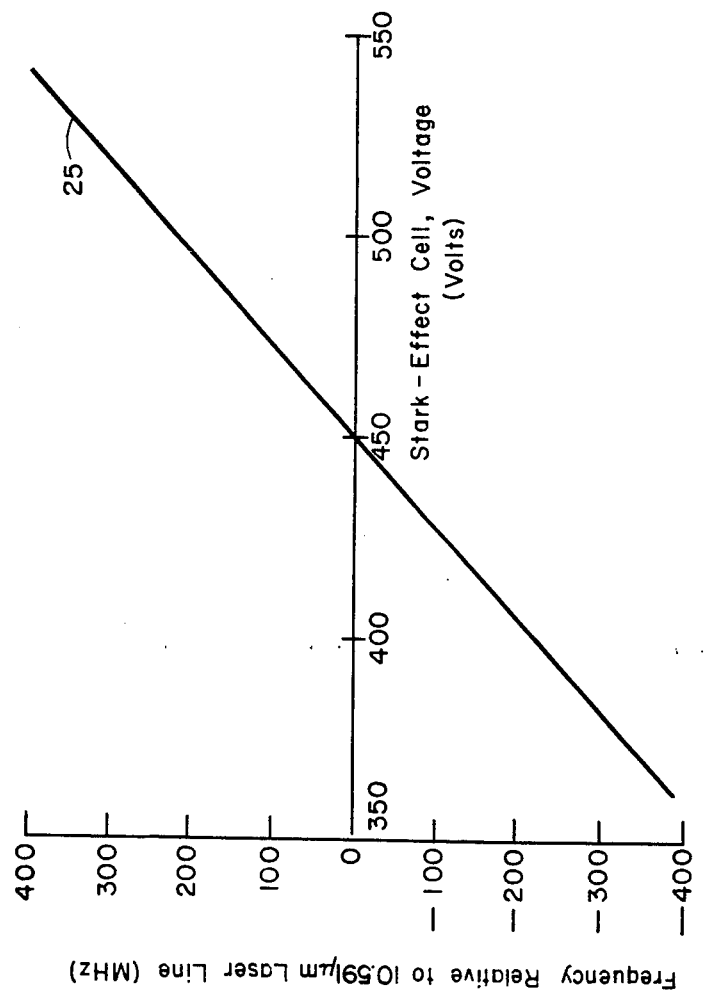

Additional objects, advantages and characteristic features of the present invention will become apparent from the following detailed description of a preferred embodiment of the invention when considered in conjunction with the accompanying drawing wherein:

FIG. 1 is a schematic diagram illustrating an optical frequency modulation demodulator in accordance with the invention; and FIG. 2 is a graph showing the center frequency of the absorption resonance provided by the Stark-effect cell in the demodulator of FIG. 1 relative to a specific carrier frequency as a function of the voltage applied to the Stark-effect cell.

Referring to FIG. 1 with greater particularity, an incoming frequency modulated laser beam 10 is shown incident upon receiving optics 12, which may include an inverting telescope when the beam 10 has been generated at a distant transmitter of a laser communication system. As a specific illustrative example, the laser beam 10 may be generated by a $CO_2$ laser utilzing the P(20) 10.591 $\mu$m laser transition, so that the beam is frequency modulated about a carrier frequency corresponding to 10.591 $\mu$m. It should be understood, of course, that frequency modulated laser beams at other frequencies and generated by other lasers may be employed within the principles of the invention.

Disposed in the path of the laser beam 10 is a Stark-effect cell 14. The Stark-effect cell 14 contains a gas which has an absorption resonance in the vicinity of the carrier frequency of the laser beam 10, and which resonance can be frequency tuned by application of a suitable electric field within the cell 14. When the frequency modulated laser beam 10 has a carrier frequency corresponding to 10.591 $\mu$m, the Stark-effect cell 14 may contain deuterated ammonia ($NH_2D$) which has an absorption resonance corresponding to the transition $4_{04}(a) \rightarrow 5_{05}(a)$ and the frequency of which lies approximately 1900 MHz below the line center frequency for the 10.591 $\mu$m laser line.

As a specific illustrative example for use in conjunction with the aforementioned exemplary carrier frequency, the Stark-effect cell 14 may be a glass tube of 2 cm diameter and 10 cm length filled with equal parts of $NH_3$ and $ND_3$ (which combines to form $NH_2D$) at a pressure of 0.5 Torr. The cell 14 is provided with a pair of end windows 16 and 18 of NaCl and a pair of parallel electrode plates 20 and 22 of stainless steel disposed on opposite sides of the laser beam 10. The plates 20 and 22 may be 10 cm long and 1 cm wide with a plate separation of 1.3 mm.

In order to tune the center frequency of the absorption resonance provided by Stark-effect cell 14 to a value substantially equal to the carrier frequency of the laser beam 10, a dc voltage from a variable dc power supply 24 is applied between the electrode plates 20 and 22 of the cell 14. Preferably, the non-grounded output terminal of the power supply 24 is connected directly to one of the cell electrode plates such as 20. The center frequency of the absorption resonance for the aforementioned exemplary Stark-effect cell 14 relative to that corresponding to the wavelength of 10.591 $\mu$m as a function of the voltage applied to cell 14 is shown by the characteristic 25 of FIG. 2. It may be seen that for a Stark-effect cell voltage of 450 volts, the center frequency of the absorption resonance coincides with the 10.591 μm line center frequency, and as the Stark-effect cell voltage is varied between about 360 volts and about 540 volts, the center frequency of the absorption resonance varies linearly from about 400 MHz below to about 400 MHz above the 10.591 μm line center frequency. Thus, the Stark-effect cell 14 provides a linear frequency versus voltage characteristic having a slope of about 4.4 MHz per volt.

In order to provide an indication of the magnitude and polarity of the frequency difference between the instantaneous frequency and the carrier frequency of the laser beam 10, a frequency discriminant is produced by varying the center frequency of the absorption resonance of the Stark-effect cell 14 about the carrier frequency at a dither frequency higher than the highest frequency to be demodulated, and preferably at least about twice the highest frequency to be demodulated. The maximum dither rate is limited by the bandwidth of the absorption resonance for the particular Stark-effect gas employed. For the aforementioned specific exemplary Stark-effect cell 14, the dither frequency may be as high as 40 MHz; however, higher dither frequencies may be employed if the pressure of the gas within the cell 14 is increased.

An alternating reference signal at the dither frequency is generated by a reference oscillator 26 and is applied between the electrode plates 20 and 22 of the Stark-effect cell 14. Preferably, the non-grounded output terminal of the reference oscillator 26 is coupled to the same electrode plate 20 as that receiving the bias voltage from dc power supply 24, and dc isolation from the power supply 24 is achieved by interposing a capacitative coupling 28 between reference oscillator 26 and plate 20. As a specific illustrative example for use in conjunction with the aforementioned 10.591 μm carrier frequency and Stark-effect cell 14 having the aforedescribed specific parameter values, the reference oscillator 26 may be a sine wave generator providing a reference voltage of 20 volts peak-to-peak at a dither frequency of 50 KHz.

As the absorption resonance of the Stark-effect cell 14 is varied, the laser beam 10 passing through the Stark-effect cell 14 becomes amplitude modulated. The amplitude modulation on the beam 10 is such that the amplitude of the fundamental amplitude modulation component is indicative of the magnitude of the frequency difference between the instantaneous frequency of the laser beam 10 and the average center frequency of the Stark-effect cell absorption resonance, and the phase of the fundamental amplitude modulation component is indicative of the polarity of the aforementioned frequency difference. The resultant amplitude modulated laser beam 30 emerging from the Stark-effect cell 14 impinges on a photodetector 32 which produces an electrical signal which varies in amplitude in accordance with the amplitude modulation on the beam 30. For laser energy at frequencies in the vicinity of 10.591 μm, an appropriate exemplary photodetector 32 is a HgCdTe photodiode.

The electrical output signal from the photodetector 32 and the reference signal from the reference oscillator 26 are applied to a phase-sensitive detector 34 which produces an error signal having an amplitude proportional to the amplitude of the output signal from the photodetector 32 and a polarity indicative of the phase of the photodetector output signal. Thus, the error signal has an amplitude and polarity indicative of the magnitude and polarity, respectively, of the frequency difference between the instantaneous frequency and the carrier frequency of the laser beam 10.

The error signal from the phase-sensitive detector 34 is fed through a low-pass filter 36 having an upper cutoff frequency less than the dither frequency but not less than the highest frequency to be demodulated. Preferably, the upper cutoff frequency of the low-pass filter 36 is not greater than about half the dither frequency. Thus, for the aforementioned specific exemplary dither frequency of 50 KHz, the low-pass filter 36 would have a passband ranging from dc to about 25 KHz.

The output signal from the low-pass filter 36 is amplified in a dc amplifier 38 to produce the output voltage $v_{out}$ from the demodulator. The voltage $v_{out}$ is fed back to the Stark-effect cell 14 (preferably by connecting the non-grounded output terminal of dc amplifier 38 to electrode plate 22) to cause the center frequency of the absorption resonance provided by the cell 14 to track the instantaneous frequency of the laser beam 10. Since the center frequency of the absorption resonance is linearly related to the voltage applied to the Stark-effect cell 14 in accordance with the voltage versus frequency characteristic illustrated in FIG. 2, it may be seen that as the center frequency of the absorption resonance tracks the instantaneous frequency of the laser beam 10, the voltage $v_{out}$ has an amplitude proportional to the frequency modulation on the laser beam 10 as determined by the frequency versus voltage characteristic of the Stark-effect cell 14. Moreover, by connecting the demodulator output and the dc power supply 24 to different electrode plates 22 and 20, respectively, of the Stark-effect cell 14, the demodulator output voltage $v_{out}$ may be obtained with respect to ground rather than with respect to a dc level of several hundred volts.

Although the present invention has been shown and described with reference to a particular embodiment, nevertheless, various changes and modifications which are obvious to a person skilled in the art to which the invention pertains are deemed to lie within the spirit, scope and contemplation of the invention.

What is claimed is:

1. An optical frequency modulation demodulator for providing a signal indicative of the frequency modulation on a laser beam which is frequency modulated relative to a carrier frequency comprising:

a Stark-effect cell disposed in the path of said laser beam and containing a gas having an absorption resonance in the vicinity of said carrier frequency, the center frequency of said absorption resonance varying linearly as a function of the voltage applied to said Stark-effect cell in accordance with a predetermined frequency versus voltage characteristic;

means for applying a dc signal to said Stark-effect cell to adjust the center frequency of said absorption resonance to a value near said carrier frequency;

means for applying an alternating reference signal at a dither frequency higher than the highest frequency to be demodulated to said Stark-effect cell to vary the center frequency of said absorption resonance at said dither frequency and thereby amplitude modulate said laser beam such that the amplitude of the fundamental amplitude modulation component is indicative of the magnitude of the frequency difference between the instantaneous frequency of said laser beam and the average center frequency of said absorption resonance, and the phase of said fundamental amplitude modulation component is indicative of the polarity of said frequency difference;

means for producing an electrical signal corresponding to the *amplitude* modulation on said laser beam;

means for producing from said reference signal and said electrical signal an error signal indicative of the magnitude and polarity of said frequency difference;

low-pass filter means having an upper cutoff frequency less than said dither frequency but not less than the highest frequency to be demodulated for processing said error signal; and means for applying the output signal from said low-pass filter means to said Stark-effect cell to cause the center frequency of said absorption resonance to track the instantaneous frequency of said laser beam and for providing an electrical output signal having an amplitude proportional to the frequency difference between said instantaneous frequency and said carrier frequency as determined by said frequency versus voltage characteristic.

2. An optical frequency modulation demodulator according to claim 1 wherein said dither frequency is not less than about twice the highest frequency to be demodulated, and said upper cutoff frequency of said low-pass filter means is not greater than about half said dither frequency.

3. An optical frequency modulation demodulator for providing a signal indicative of the frequency modulation on a laser beam which is frequency modulated relative to a carrier frequency comprising:

A Stark-effect cell disposed in the path of said laser beam and containing a gas having an absorption resonance in the vicinity of said carrier frequency, said Stark-effect cell including first and second spaced electrically conductive plates disposed parallel to one another on opposite sides of said laser beam, the center frequency of said absorption resonance varying linearly as a function of the voltage between said plates in accordance with a predetermined frequency versus voltage characteristic;

means for applying a dc signal to said first plate to adjust the center frequency of said absorption resonance to a value near said carrier frequency;

means for applying an alternating reference signal at a dither frequency higher than the highest frequency to be demodulated to said first plate to vary the center frequency of said absorption resonance at said dither frequency and thereby amplitude modulate said laser beam such that the amplitude of the fundamental amplitude modulation component is indicative of the magnitude of the frequency difference between the instantaneous frequency of said laser beam and the average center frequency of said absorption resonance, and the phase of said fundamental amplitude modulation component is indicative of the polarity of said frequency difference;

means for producing an electrical signal corresponding to the amplitude modulation on said laser beam;

means for producing from said reference signal and said electrical signal an error signal indicative of the magnitude and polarity of said frequency difference;

low-pass filter means having an upper cutoff frequency less than said dither frequency but not less than the highest frequency to be demodulated for processing said error signal; and means for applying the output signal from said low-pass filter means to said second plate to cause the center frequency of said absorption resonance to track the instantaneous frequency of said laser beam and for providing an electrical output signal having an amplitude proportional to the frequency difference between said instantaneous frequency and said carrier frequency as determined by said frequency versus voltage characteristic.

4. An optical frequency modulation demodulator according to claim 3 wherein said means for applying said alternating reference signal to said first plate includes a reference oscillator for generating said alternating reference signal, and means for capacitively coupling the output from said reference oscillator to said first plate.

* * * * *